UNITED STATES PATENT OFFICE.

WALLACE APPLETON BEATTY, OF NEW YORK, N. Y., ASSIGNOR, BY DIRECT AND MESNE ASSIGNMENTS, TO GEORGE W. BEADLE, OF NEW YORK, N. Y.

PLASTIC PRODUCT.

1,158,962.     Specification of Letters Patent.     Patented Nov. 2, 1915.

No Drawing.     Application filed January 3, 1913. Serial No. 740,076.

*To all whom it may concern:*

Be it known that I, WALLACE APPLETON BEATTY, a citizen of the United States, residing at New York, in the county of New York and State of New York, have invented certain new and useful Improvements in Plastic Products; and I do hereby declare the following to be a full, clear, and exact description of the invention, such as will enable others skilled in the art to which it appertains to make and use the same.

This invention relates to plastic products adapted for a wide variety of uses, and has for its object to produce products of this nature which will be water-proof as well as insoluble in chemicals in general, and will therefore, be more efficient for many uses than those heretofore proposed.

To these ends the invention consists in the novel products made from a novel gum, all as will be more fully hereinafter disclosed and particularly pointed out in the claims.

In order that the invention may be more clearly understood, it is said:—In my prior application #702,046, filed June 6, 1912, entitled Artificial gums and process of producing the same, I have disclosed and claimed a new gum and method of making it, which method, when briefly stated, consists in forming a new compound from a mixture of acetone and phenol to which is added a small quantity of acid, in order to produce what I believe to be dioxy-diphenyl-dimethyl-methane. This new compound is then further acted upon, as stated in said application above, by formaldehyde, in order to produce a further tenacious product constituting the said new gum above mentioned. This new gum is found to be inodorous, insoluble in water, is relatively strong and tenacious, and it may be colored with dyes or with other substances. I find further that this new gum when first produced, is more or less soluble in alkali; that it becomes less and less soluble after it has been heated at say 100° C., until when it has been kept at that temperature for say two hours, it is scarcely soluble at all even in strong alkali. When brought to this condition, however, acids will convert it at ordinary temperatures into a mass which is insoluble in alkali.

I find the gum is also soluble in alcohol, ether, acetone, glacial acetic acid, amyl alcohol, amyl acetate and acetylene tetra-chlorid, or mixtures of these. It is, however, insoluble in oils, such as linseed oil, turpentine, and mineral oils. When in its insoluble condition, it is an inodorous transparent mass quite strong, non-brittle and tenacious. It is also quite hard and will not burn unless kept continually in the flame. In this condition of the gum, I have not found any solvent for it.

A variety of new products may be made from this new gum as will now be disclosed. For example, I have found that it is sufficiently inexpensive to manufacture to serve as a most efficient tiling or floor covering. For this purpose, I may impregnate blocks of wood of various sizes, or blocks of cement, or other porous substances, with the new gum and form the floor material thereof in the same manner that it is now formed of the regular products in common use.

The gum likewise constitutes a most efficient floor polish, and for this purpose the wood itself may be simply impregnated with the gum in a manner similar to the impregnation of wood with ordinary varnishes.

The solution of the gum, of course, is regulated to give the proper consistency for the particular purpose to which it is applied. But, in some cases, I prefer to heat the coated substances to a temperature sufficient to render the gum insoluble in chemicals in general, unless of course the said temperature, usually about 100° to 150° C., will injure the substances coated. As an alternative method of making the coating absolutely insoluble, I may, when I make the solution of the gum, add sufficient acid to give the said solution an acid reaction rather than an alkaline one, whereupon I have discovered that the gum upon drying, will itself become insoluble.

Another new product arises from the use of my new gum in leathers dressed or coated with this said gum. In producing these products, the leather is prepared in the same way, or in a manner similar to the preparation now employed when coating these said leathers with the well known pyroxylin compounds; my gum in solution, preferably in an alcohol or an acetone solution, is applied to the leathers in the same way as the pyroxylin compounds are now applied, or by means of a brush, or by any other suitable and well known means, and if the solution is rendered acid, as above stated, the leather does not have to be heated in order to render the coating absolutely insoluble. The result is, leather articles coated with a hard flexible and insoluble gum, which offers great resistance to wear and tear, and which has a high polish. Of course, the leathers may be suitably colored in the well known manner, and I find the gum itself takes dyes and other coloring matter, so that the products may be given any desired color and finish. Of course, the leathers may be finished by passing through rollers, or by other well known means.

Fabrics, such as cloth, paper, etc., may likewise be coated with this gum, and in such cases, I prefer to have the coat rather thin in order to produce the necessary flexibility.

For some purposes, I prefer to impregnate the leather as well as the fabric with my gum, and thereby produce harder and more tenacious substances. In fact, I may impregnate paper with the gum to produce a hard tenacious insoluble board material, which may be used as a roofing material, as lumber, and for a large variety of uses.

I may further load the gum with various filling materials, such as sand, for example, when a roofing material is to be produced, or such as leather dust, wood dust, graphite, and a host of other substances, in order to adapt the finished material to special uses.

A very pleasing and useful article is produced by simply coating polished or stained wood with this gum, wherein the same may be sawed and cut up as ordinary lumber to produce articles of furniture or other articles, or the furniture and other articles may be as made of ordinary wood and gum applied thereto. In this latter case, I have found that when the article is exposed to the weather over long periods of time, the gum retains its high polish and brilliant effects unimpaired, whereas the best furniture varnish under the same conditions, goes all to pieces.

I have found it especially useful to subject wood to a baking or heating process in order to render the same porous before applying the gum, in which case, the grain of the wood is made permanent, which shows through the gum to render it very ornamental, while the said gum is thus afforded a firm and safe anchorage into the material of the wood.

The gum when dissolved and mixed with a suitable pigment, such for example, as lamp black, zinc oxid, etc., makes a very hard tenacious and durable enamel. The gum, whether heated or not, is found to be exceedingly tenacious when applied to metal, and therefore, it constitutes a valuable lining or coating for metal articles, such as pans, dishes, containers, or vessels, etc. It is especially adapted for receptacles for containing articles of food, in that it is absolutely chemically inert toward all such articles, it is cheap to produce, and it further serves, when applied in a liquid state, to close the container air tight. A still further valuable use in this connection is found in paper containers of all kinds which may be impregnated or coated with this gum to render the same liquid tight, strong and durable.

Another use to which this gum is readily applied is for the production of adhesives, cements, mucilage substitutes, etc. In such cases, it is merely dissolved in the proper solvent, such as ether, alcohol or acetone, or other solvents according to the purpose to which the cement is to be applied and preserved in proper container, whereupon it may be applied directly to the article and allowed to dry.

A further use for this gum is in the coating of statues, houses, structures of cement, of bricks, and other porous material in general, in order to render the same moisture proof. Even shingles and roofs of houses may be coated therewith.

It makes a good artificial ivory, horn, tortoise shell, etc., when suitably colored and loaded with other substances, such as used in connection with pyroxyline to make similar articles.

The gum further is found to be very useful in coating the walls of rooms, bath rooms, etc., whereupon they have an enamel finish to which water may be applied and the room kept in a perfectly sanitary condition at all times.

It further makes a good indelible ink in that when once applied to a porous surface, it cannot be gotten out without destroying the paper or other material upon which it is written. For this purpose, it may be given any desired color, and when linen is marked therewith, it is impossible to get it out of the material short of the destruction of the fabric.

The gum is especially applicable to the manufacture of dress suit cases, trunks, and other such receptacles, for which purposes it may be either used loaded with other materials, such as leather dust, etc., or it may be used without such fillers. In fact, the gum takes fillers very much as does rubber and it may be modified in texture and appearance to suit the particular use to which it is made.

When a sufficient amount of solvent is added thereto, it may be made as liquid as water, and when a lesser amount of solvent is employed, it may be made of a consistence of putty, in which condition it may be molded, or otherwise shaped to suit the purposes for which it is intended.

It is especially useful when in a plastic condition and when sufficient acid has been added thereto to give it an acid reaction, for then one has, in this gum, at his command a very inexpensive material out of which he may readily mold articles capable of the widest variety of uses and which have a commercial importance.

When this gum is suitably colored, as by a variety of yellow anilin dyes, or suitable pigments, a very good imitation of amber may be produced.

When the gum is properly made, it is very transparent, and therefore, it lends itself well to the production of imitation amber, tortoise shell, ivory, etc.

There are a number of other uses to which my new gum may be applied, which are not necessary to mention, but one quite important use is that of paints of the nature of bronzing liquids. For example, the well known so called aluminum paint consisting of finely divided aluminum, amyl acetate, and pyroxyline can be greatly improved by my product, by simply dissolving my gum in amyl acetate, and loading the solution with finely divided aluminum, or other finely divided material, or pigments. When in this condition, it is applied to metal or other surfaces, as for example, radiators, and there results a hard smooth sanitary enamel-like surface which is resistant to all chemical action or oxidation, and therefore, maintains its polish and appearance over very long periods of time.

A further use of my product is the covering of celluloid articles in general, such as brushes, combs, buttons, moving picture films, and a host of other articles with a solution of my gum, in order to render said articles less inflammable. In order to accomplish this, the said articles may be either dipped in the solution, or it may be otherwise applied thereto.

A valuable use of adhesives or cements made from my product is found in the anchoring of brush bristles to their holders. For this purpose, the gum is dissolved to the proper consistency and the ends of the bristles are coated therewith, there being sufficient of the material left to firmly anchor the bristles to their holders.

Another most important use for my product is the insulation of wires and conductors in general. For this purpose, a solution of the proper consistency is made up, and the said solution material applied to the wire in any suitable and well known manner; for example, as by passing the wire through a bath containing the solution, or by impregnating strips of cloth with the solution and wrapping it around the wire, or by covering the wire with a suitable fabric or other material and impregnating the said fabric or material with my solution.

Of course, slab like articles, or other shaped articles may be made out of my material and used likewise for insulating purposes precisely as is hard rubber used at present.

A number of insulating uses are found, in my product when filled with silex, lamp black, and other pigments. In such case, it resembles hard rubber, takes the place of the same for a large variety of uses, especially for lamp sockets, etc.

Another use for my gum is found in the making of matrices for use in connection with linotype machines, and for other purposes. In applying it to this purpose, I merely coat the form consisting of the set up lines of type, with my gum in a plastic condition, having previously coated the said form with oil, or some other repellent, and then upon applying heat to the gum, it will set immediately, or by putting sufficient acid therein, it will likewise set, or by putting acid therein and applying heat, it will set still more quickly. In the foregoing process, I find it convenient to employ a filler such as powdered asbestos, silex, or other heat resisting material in the gum, and accordingly load the gum with one or more of such materials, in order that the finished matrix may effectually resist the molten metal to which it is subjected.

Not only may I employ acetone, phenol and aldehyde to produce my gum, as above mentioned, but I may of course, use homologues of these and produce similar substances, which would come well within the scope of my invention. A good homologue for acetone is di-ethyl ketone or ethyl methyl ketone, and cresol, as well as acet-aldehyde in place of phenol and formaldehyde respectively, all as will be obvious to those skilled in the art.

It is therefore obvious that those skilled in the art may vary the properties as well as the composition of my gum, without departing from the spirit of my invention. For example, well known homologues of the acetone, phenol and form-aldehyde may be employed, all as stated in one or more companion cases filed by me and of even date herewith. Therefore, I do not wish to be limited to the above disclosure, except as may be required by the claims.

What I claim is:—

1. The herein described article of manufacture consisting of a fibrous material impregnated with a condensation product, of a ketone, a phenol and an aldehyde, substantially as described.

2. The herein described article of manufacture consisting of a fibrous material containing cellulose impregnated with a condensation product, or a ketone, a phenol and an aldehyde, substantially as described.

3. The herein described new article of manufacture consisting of a woven fabric impregnated with a condensation product, of a ketone, a phenol and an aldehyde, substantially as described.

In testimony whereof, I affix my signature, in presence of two witnesses.

WALLACE APPLETON BEATTY.

Witnesses:
T. A. WITHERSPOON,
R. M. PARKER.